United States Patent [19]

Martinez et al.

[11] Patent Number: 5,009,012
[45] Date of Patent: * Apr. 23, 1991

[54] SABER SAW

[75] Inventors: David M. Martinez, New Bern, N.C.; Gordon C. Campbell, Exton, Pa.

[73] Assignee: Robert Bosch Power Tool Corporation, New Bern, N.C.

[ * ] Notice: The portion of the term of this patent subsequent to Dec. 5, 2006 has been disclaimed.

[21] Appl. No.: 402,333

[22] Filed: Sep. 1, 1989

Related U.S. Application Data

[63] Continuation of Ser. No. 238,037, Aug. 29, 1988, Pat. No. 4,884,344.

[51] Int. Cl.$^5$ .............................................. B23D 49/04
[52] U.S. Cl. ......................................... 30/394; 30/273
[58] Field of Search ................. 30/272, 273, 392, 393, 30/394; 83/721, 699, 746

[56] References Cited

U.S. PATENT DOCUMENTS 3,802,079 4/1974 Ketchpel, Jr. et al. .......... 30/394 X
4,114,270 9/1978 Jansen-Henfeld et al. ........... 30/394

Primary Examiner—Douglas D. Watts
Assistant Examiner—Willmon Fridie, Jr.
Attorney, Agent, or Firm—Michael J. Striker

[57] ABSTRACT

A saber saw comprises an elongated displacing rod which supports a saw blade and is reciprocable in a displacement direction extending along its elongation and also swingable in a swinging direction which is transverse to the displacement direction, and a unit for moving the displacement rod in the swinging direction and including a driveable control element having a cam surface and a sensing element which is connected with the displacement rod and is controlled by the control element, the control element being rotatable about an axis of rotation, the cam surface of the control element being formed as a symmetrical conical surface which is eccentrical relative to the axis of rotation of the control element.

6 Claims, 2 Drawing Sheets

SABER SAW the sentence: This is a continuation of application Ser. No. 238,037, filed Aug. 29, 1988 now U.S. Pat. No. 4,884,344.

BACKGROUND OF THE INVENTION

The present invention relates to a saber saw which is provided with a swinging unit.

Saber saws of the above mentioned general type are known in the art. One such saber saw is disclosed for example in the European Patent No. 151,524. This saber saw has a very complicated construction. The control surface of the toothed wheel which is driven from a motor pinion is very expensive to manufacture because its rising and lowering cam path. Also, the saw is provided with two different cooperating tilting levers and a bearing unit with a spiral spring to transfer the swinging movement to the plunger. This leads further to a high space consumption for the swinging unit.

SUMMARY OF THE INVENTION

Accordingly, it is an object of the present invention to provide a saber saw which eliminated the disadvantages of the prior art.

More particularly, it is an object of the present invention to provide a saber saw in which a cam surface for producing a swinging movement has a very simple construction and it simple to manufacture.

It is also an object of the present invention to transmit the swinging movement to the displacement rod in a simpler and reliable manner.

In keeping with these objects and with others which will become apparent hereinafter, one feature of the present invention resides, briefly stated, in a saber saw in which the cam surface of a control element is formed as a symmetrical conical surface which is eccentrical to an axis of rotation of the control element.

When the saber saw is designed in accordance with the present invention it achieves the above mentioned objects.

In accordance with another feature of the present invention, the sensing element which cooperates with the cam surface and connected with the displacement rod has an approximately constant distance from the axis of rotation of the control element and during rotation of the control element moves up and down on the conical surface.

Still another feature of the present invention is that the sensing element is formed as a rotatably supported roller with an outer contour which corresponds to the conical surface. This leads in condition of low friction to an advantageous linear contact on the cam surface.

A further feature of the present invention is that the roller is mounted on a bearing block which surrounds the displacement rod, and the displacement rod is longitudinally displaceable in the bearing block.

Still a further feature of the present invention is that the bearing block is arranged swingably about an immovable axis in the vicinity of the clamping of point for the saw blade. The arrangement of a swinging bearing for the bearing block of the displacement rod near the clamping point of the saw blade improves the guidance of the saw blade and as a result provides for an exact and fine saw cut. Moreover it simplifies the sealing of the transmission chamber.

Still another feature of the present invention is that the crank pin engages in a sliding piece which is fixedly connected with the displacement rod and forms together with the sliding piece a crank oscillating transmission so that the crank pin in the sliding piece additionally moves toward and away of the axis of the displacement rod. This provides for a simple and reliable solution for the transmission of the displacement movement to the saw blade during the swinging movement.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF A PREFERRED EMBODIMENT

Figure 1:
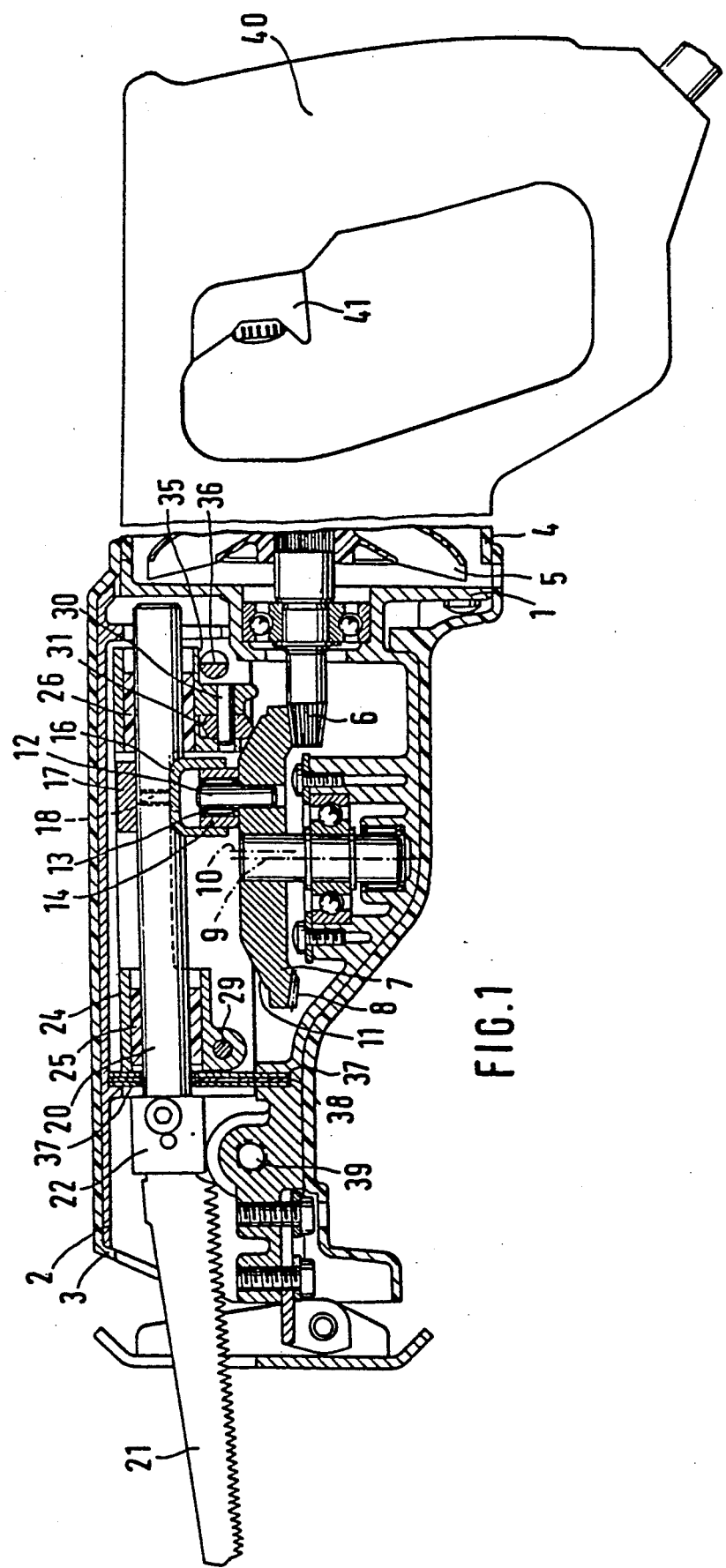
FIG. 1 is a view showing a cross-section of a saber saw in accordance with the present invention.

A saber saw in accordance with the present invention has a transmission housing 1 with a transmission cover 2 which are both surrounded by an insulating housing 3. A not shown electric motor with a fan wheel 5 and a motor pinion 6 are located in a motor housing 4. A control element 7 which extends perpendicularly to the axis of the pinion 6 and is formed as a toothed wheel is rotatably supported in the transmission housing 1. A toothing 8 is arranged on the lower side of the control element 7 symmetrically to its axis of rotation 9. The toothing 8 engages with the toothing of the motor pinion 6. On the upper side which is opposite to the toothing 8 the control element 7 is provided with a conical surface 11 which is formed as a cam surface symmetrically to an axis of symmetry 10. The axis of symmetry 10 is arranged eccentrically to the axis of rotation 9 of the control element. The control element 7 serves as a crank disc. A crank pin is inserted into the crank disc form above. The crank pin is composed of a bearing pin 12, a bearing 13, and a sleeve 14 which is located on the bearing 13 and is somewhat barrel-shaped on the outside.

Figure 2:
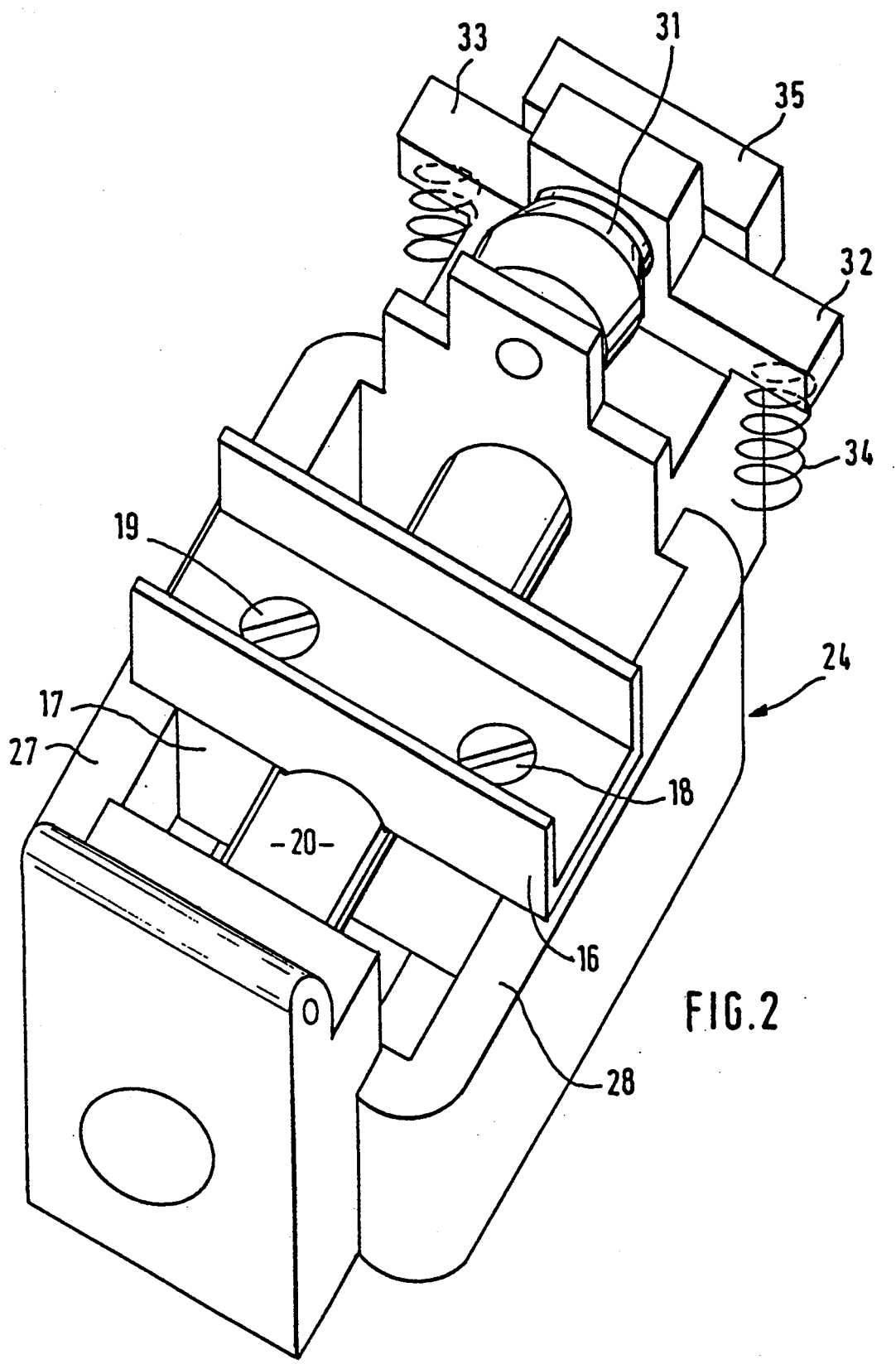
FIG. 2 is a perspective view of a bearing block of the saber saw of the present invention.

The sleeve 14 engages in a U-shaped sliding member 16. The latter is mounted on a displacement rod 20 by a clamping bracket 17 and two crews 18 and 19 as shown in FIG. 2. A saw blade 21 is mounted on the front end of the displacement rod 20 by means of a clamping plate 22. The displacement rod 20 is axially displaceably supported in a bearing block 24 with bearing sleeves 25 and 26. The sliding member 16 is laterally mounted on longitudinal beams 27 and 28 has shown in FIG. 2. The bearing block 24 is rotatable about a pin 29 which is arranged transversely to the displacement rod 16 in the housing cover 2 and serves as a swinging axis. Ther bearing block 24 carries at its rear side a roller 31 which serves as a sensing element and is arranged on a pin 30 which extends parallel to the displacement rod 16. The roller 31 has an outer contour which corresponds to the conical surface 11 of the control member 7.

A small angular change between the roller 31 and the conical surface 11 produced by the swinging movement of the bearing block 24 is compensated by the elasticity of the material of the roller. The bearing block 24 has two lateral projections 32 and 33 in the region of the roller 31.

A pressure spring 34 engages each of the projections 32 and 33 and supported upwardly against the housing cover 2 as shown in FIG. 2 in which the bearing block is seen from below. A downwardly located surface 35 of the bearing block 24 is in contact with an eccentric shaft 36 of a not shown switching lever. The swinging movement of the saw can be produced by the switching lever in a known manner.

A transmission chamber is sealed at its front end by a felt plate 38 which is inserted between two sealing sheets 37. The sealing elements are mounted in the vicinity of the pin 29 which serves as an axis of rotation for the swinging movement of a transmission enclosure 1, 2. The transmission housing 1 is provided at its front end with threaded openings 39 for an auxiliary handle. A conventional electrical pressure switch 41 is mounted in a handle 40.

After switching on of the motor, the control element 7 is driven in rotation and produces, via the crank oscillating transmission 12, 14, 16, a reciprocating movement of the displacement rod 20 and the saw blade 21. In the position of the eccentric shaft 36 which is shown in FIG. 1, the swinging movement is shut off. For maximum swinging stroke, shaft 36 is turned 90° with its flat side toward the surface 35, so that the pressure springs 34 of the bearing block 24 are pressed downwardly and the roller 31 abuts against the conical surface 11.

Because of the fact that the axis of symmetry 10 of the conical surface 11 is eccentrical relative to the axis of rotation 9 of the control element 7, the point of contact of the conical surface with the roller 21 travels relative to the roller toward and away, while the control element 7 rotates. Thereby a swinging movement about the pin 29, which is directed transversely to the axis of the displacement rod 20 is produced. This swinging movement is transferred to the saw blade 21. The sawing displacement movement of the displacement rod is thereby not affected, since the barrel-shaped sleeve 14 slides up and down in the sliding member 16.

It will be understood that each of the elements described above, or two or more together, may also find a useful application in other types of constructions differing from the types described above.

While the invention has been illustrated and described as embodied in a saber saw, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A saber saw, comprising an elongated displacing rod which supports a saw blade and is reciprocable in a displacement direction extending along its elongation and also swingable in a swinging direction which is transverse to said displacement direction; and means for moving said displacement rod in said swinging direction and including a driveable control element having a cam surface and a sensing element which is connected with said displacement rod and is controlled by said control element, said control element being rotatable about an axis of rotation, said cam surface of said control element being formed as a symmetrical conical surface which is eccentrical relative to said axis of rotation of said control element.

2. A saber saw as defined in claim 1; and further comprising a motor having a motor pinion with a toothing, said control element being provided with a toothing which is in engagement with said toothing of said motor pinion.

3. A saber saw as defined in claim 1, wherein said control element is formed as a crank disc for producing a sawing stroke of said displacing rod, and carries an eccentrically arranged crank pin.

4. A saber saw as defined in claim 3, wherein said eccentrically arranged crank pin has a spherical shape.

5. A saber saw as defined in claim 3; and further comprising a sliding member which is fixedly connected with said displacement rod, said crank pin engaging in said sliding rod so as to form with said sliding rod a crank oscillating transmission, said displacement rod having an axis, said crank pin being additionally movable in said sliding member toward and away of said axis of said displacement rod.

6. A saber saw as defined in claim 1; and further comprising means forming a transmission chamber which has a region through which said displacement rod extends outwardly, said displacement rod being swingable about a swinging axis; and further comprising sealing means which seals the transmission chamber in said region near said swinging axis.

* * * * *